United States Patent [19]

Hunt

[11] Patent Number: 5,277,854
[45] Date of Patent: Jan. 11, 1994

[54] METHODS AND APPARATUS FOR MAKING GRIDS FROM FIBERS

[76] Inventor: John F. Hunt, 2420 E. Washington Ave., Apt. 5, Madison, Wis. 53704

[21] Appl. No.: 711,221

[22] Filed: Jun. 6, 1991

[51] Int. Cl.⁵ .............................. B28B 1/52
[52] U.S. Cl. .................... 264/86; 162/223; 162/224; 162/382; 264/120; 264/257; 264/313; 264/517; 425/84; 425/403.1; 425/405.1
[58] Field of Search ............ 425/84, 85, 80.1, 83.1, DIG. 19, DIG. 44, DIG. 112, DIG. 119, 405.1, 417, 403, 447, 425/DIG.; 264/86, 87, 120, 121, 517, 518, 555, 571, 257, 166, 313, 314; 162/223, 224, 226-228, 230, 296, 382

[56] References Cited

U.S. PATENT DOCUMENTS

| | | | |
|---|---|---|---|
| 3,166,467 | 1/1965 | Reifers et al. | 264/87 X |
| 3,255,062 | 6/1966 | Wilkins | 264/86 X |
| 3,290,421 | 12/1966 | Miller, Jr. | 264/86 X |
| 3,354,248 | 11/1967 | Haas et al. | 264/120 X |
| 3,449,207 | 6/1969 | Modersohn | 264/86 X |
| 4,162,877 | 7/1979 | Nyberg | 425/84 |
| 4,388,263 | 6/1983 | Prunty | 264/257 |
| 4,702,870 | 10/1987 | Setterholm et al. | 264/87 |
| 4,753,713 | 6/1988 | Gunderson | 162/227 X |

Primary Examiner—Richard L. Chiesa
Attorney, Agent, or Firm—H. Howard Silverstein; John D. Fado; Janet I. Stockhausen

[57] ABSTRACT

Method and apparatus to form grids of open cells from fibers, especially wood fibers and fibers from waste paper and mixed waste materials. The invention utilizes a screen carrying a plurality of elastomeric pads of predetermined sizes arranged thereon in predetermined spaced relation to each other. The fiber is deposited between the pads but not above the pads. The deposited fibers and the pads are compressed normal to the screen, which causes the fiber in the spaces between the pads to be consolidated both normal and parallel to the screen, resulting in a open grid having cells of the shape of the pads. Numerous variations are provided including several continuous production embodiments. The invention uses state of the art technology for virtually all aspects.

23 Claims, 9 Drawing Sheets

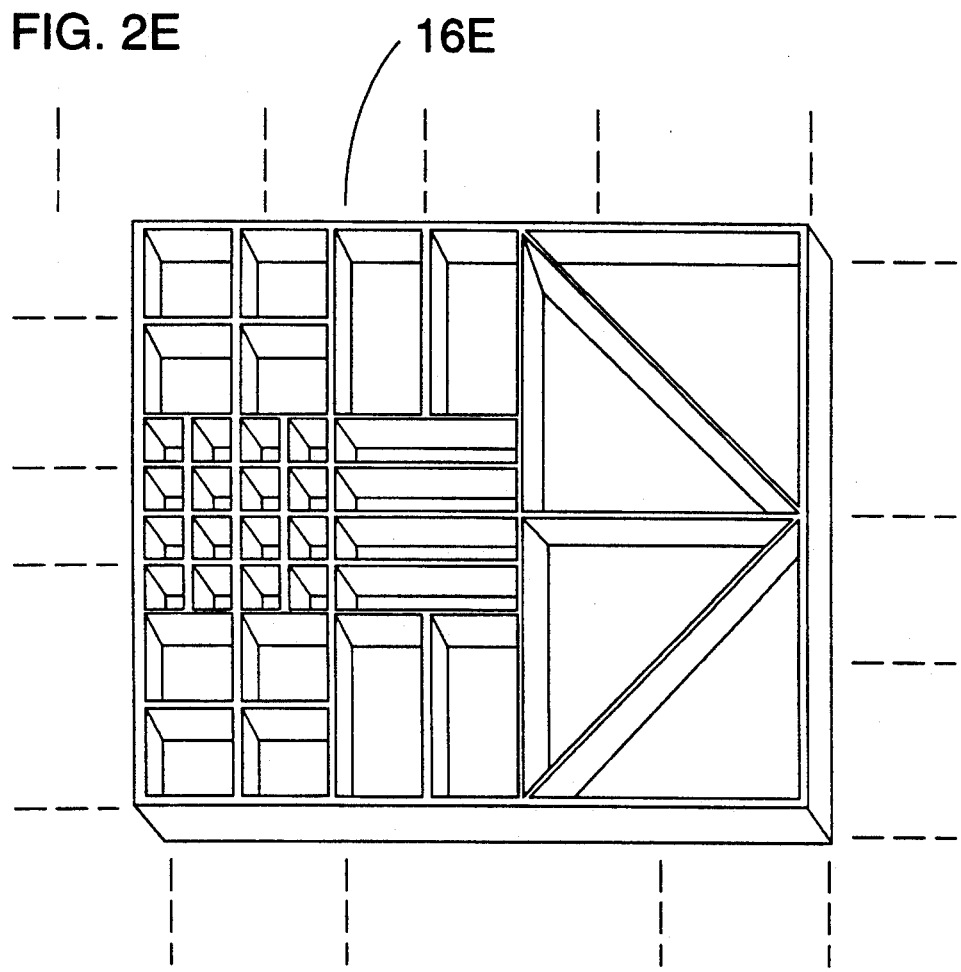

FROM ANY OF FIGS. 12 A-E

FINISHED GRID

FROM ANY OF FIGS. 12 A-E

DRYER FELT

FINISHED GRIDS

FROM ANY OF FIGS. 12 A-E

FINISHED GRIDS

METHODS AND APPARATUS FOR MAKING GRIDS FROM FIBERS

FIELD OF THE INVENTION

This invention relates to the production of open cell grids which can be used in and on various other structures as components thereof. The invention utilizes many conventional and some proprietary techniques for the manufacture of structural components from fiber.

BACKGROUND OF THE INVENTION

The present invention pertains to the production of open cell grids in a highly advantageous and inexpensive manner, and pertains to the use of fiber to produce such grids The fibers can be cellulose or other sorts, such as various plastics, fiberglass, and the like. An important advantage of the invention is to utilize wood and non-wood fiber which is otherwise not utilized.

Trees raised in the United States of America for commercial purposes are of two general types, hard and soft. Softwoods are fully utilized for the manufacture of paper, newsprint, and other paper products. The large, good quality, hardwood trees are well utilized to produce lumber.

However, there are also hardwood trees which are relatively small, somewhat deformed, or not well suited for the production of lumber for various other reasons. Further, the smaller limbs of trees are not utilizable for lumber The present invention, so far as it utilizes wood fiber, is an advantageous way of utilizing this forest fiber resource which is otherwise wasted, or, at best, under utilized.

The invention can be accommodated to use with plastic fibers, such as polyethylene and polypropylene, as well as fiberglass, and more "exotic" man-made fibers, such as aramid. These additional fibers, depending upon the end use, will add strength, water resistance, and other desirable characteristics to the final open cell grids produced in accordance with the invention.

The invention has another important advantage in that it can utilize, in addition to low-grade trees, limbs and the like, as discussed above, waste fibers of all sorts. There is a tremendous problem in the world today of having to deal with disposition of waste material. Land fills are becoming filled, and the burden on the prime natural resources is increasing. By recycling waste materials, the pressure on the landfills, the air pollution, and the like are reduced, and at the same time trees are saved, thus well husbanding our forest resources.

The invention can work with waste paper of all sorts, including computer paper, magazines, newsprint, boxes, and the like, and it can even work with mixed fibers including both such cellulosic and non-cellulosic (manmade) fibers. This in and of itself is an important advantage, because waste paper from offices and residential communities contain many contaminants such as clay, ink, plastics, staples, and the like. This mixed waste paper, etc. can be used without prepatory processing such as deinking, bleaching, or the like, and with minimal prepatory processing, such as screening to remove some of the larger contaminants, to form a structural product in accordance with the invention. This so particularly if the grid is to be incorporated into the interior of another structural item, e.g. a door. This is very important with respect to recycling in that such mixed waste paper and waste materials, an unwanted and under-utilized fiber resource, can be used. Thus, the invention has the important advantage of the ability to recycle and incorporate all sorts of wood fiber, nonwood fiber, and nonwood waste without the added expense of separation of these materials to produce new lightweight but strong structural products and components of such products.

This invention utilizes some of the technology of U.S. Pat. No. 4,702,870 by the present inventor together with another. That patent is owned in common with the present invention.

The present invention produces grids of a monolithic one-piece character. The grids are formed in accordance with the invention either in final form or in near final form and therefore do not require any additional assembly and/or attendant handling The common prior art method of making somewhat similar structural honeycomb material begins from flat sheets or strips of paper or paper-like material which are glued at spaced points, pressed, and then expanded to produce a grid of diamond-like open cells. The present invention is substantially different from and is thought to be a substantial improvement over that prior art, in that no gluing at spaced points and no expanding processes are required. The present invention also provides a step forward in the art in that very complex structures (See FIG. 2E for example) can be produced. It is impossible to produce such complex structures with prior art methods because only uniformity of the cells throughout such prior art structures is possible.

The present invention also is to be distinguished from various kinds of other fiberboard and paper making devices and methods. An important characteristic of the invention is the use of a mold element which deforms during the molding process in order to compress the fibrous material in directions perpendicular to the direction of pressing, as well as parallel to the direction of pressing. This is not found in many other such techniques, including the manufacture of egg cartons, corrugated cardboard, and the like.

Several forms of the invention produce material continuously This is a substantial improvement over all of the prior art that is of a batch nature.

SUMMARY AND ADVANTAGES OF THE INVENTION

Producing articles from fibrous material is a well developed art. The present invention has the advantage that it can utilize, depending upon the characteristics of the end product required and the particular fibers being used, all of this technology. That is, the fibers can be carried in air, water, or other fluids, the curing can be done with heat, pressure, adhesives, and the like, and drying can be accomplished utilizing many different machines and approaches to drying or otherwise finishing the formed product. This ability to use a great deal of the state of the art is an important advantage of the invention, i.e., proven technology and machinery can be used to produce better products in accordance with the invention.

Further, the invention lends itself to implementation as either a batch process or a continuous process, again depending upon the particular parameters of the particular application and the particular end product to be produced.

The invention, in its simplest form, depends upon technology similar to that of prior U.S. Pat. No. 4,702,870. It includes a mold made up of a base carrier, screen or filter, having a plurality of elastomeric pads attached to the base. These pads are of a predetermined shape and size, and are in a predetermined relation to each other on the carrier. The manner of selecting the size, shape and spacing of these pads on the screen determines the nature of the finished product, as will appear from the detailed specification below. The carrier fluid moves through the mold, depositing the fibers between the pads only. No fiber is deposited on top of the pads. These elastomeric (preferably silicone rubber) pads are a key part of the entire process, not only to establish the initial shape of the grid, but also to determine its consolidation After the fibers are deposited, the grid is consolidated by the application of pressure to the tops of the pads. As this pressure is applied, the pads compress in the direction of the applying force, but they also expand at right angles thereto, thus reducing the spaces between the pads where the fiber is located. Thus, the deposited fiber is consolidated both vertically and horizontally into an open cell grid.

After the grid is thus formed, it can be removed and/or cured and somehow finished and then used in just that form. Another option within the invention is to consolidate the grid a second time with a different set of similar pads being inserted into the grid from the opposite side as compared to the insertion of the first set of pads. This produces a finished product which is stronger, but with grid bars which are shorter and smaller than the bars which result from a single consolidation step.

There is no particular preferred embodiment as to single or double consolidation. That is, sometimes it may be desirable to produce a grid in a single pass because it is cheaper, it can be done faster, and for one particular embodiment, the bars are taller, i.e., the grid is thicker, and the reduced strength of the finished product is unimportant. In another environment, the double pressing from opposite sides may be desirable and the shorter, denser, and stronger grid produced under that particular set of conditions is deemed worth the extra effort and expense of the second pressing step.

However, more in general, given the flexibility of the invention as to fiber selection (i.e., some fibers are inherently stronger and/or bind more tightly than others); pad size, material and spacing; operating pressures, and the like, the same options available to double consolidation are also available in a single consolidation. However, double consolidation results in improved dimensional accuracy, i.e., the dimensions of a double consolidated grid, in general, will be closer to the ideal or "blueprint" dimensions than will those of a single consolidated grid.

The present invention allows the manufacture of a wide range of products displaying a diverse set of properties, e.g. a product having some resilience and/or cushioning properties may be attained, due to the wide variety of materials used and pressures available for manufacturing, the choice of single versus double consolidation, grid sizes, and the like.

Yet another option of the invention is to press the grid off of the mold after it is formed. This produces a grid having grid bars which are considerably shorter and thicker. This particular set of characteristics and performance parameters may be desirable in any particular environment. This is yet another aspect of the versatility of the invention.

Another advantage of the double pressing form of the invention is that the second mold, that is, the elastomeric pads on the second carrier or screen, can be designed with closer tolerances so that the final consolidated shape of the bars in the grid are closer to exactly what is required by the particular user environment.

Yet another advantage of this second pressing of this two pressing variation is that stray fibers which may extend from the grid after the first press, are then pushed in and consolidated into the bars, leaving the grid quite smooth at both ends In a first press, there are inevitably at least a few stray fibers which give a somewhat unsightly appearance. This may be unimportant, depending on where the invention is used, i.e., the particular demands of the particular environment and end use. For example, if the grid is to become the core of a door, stray fibers may not matter.

In the variation of the invention wherein the consolidated grid is pressed off of the mold, the apparatus used could include state of the art papermaking presses. These machines lend themselves to both continuous and batch processes. The result of this variation is a relatively thin, but highly consolidated, open cell grid which has an appearance similar to that of a flat sheet having holes punched in it. However, the performance properties of the product of this form of the invention are completely different from a simple sheet with punched holes. These differences are at least partially due to the orientation/arrangement of the individual fibers; more specifically, in a simple sheet the fibers are generally randomly arranged whereas in the invention's product the majority of the fibers are aligned following the grid pattern chosen. This generally uniform alignment of the fibers in the grids produced in accordance with the invention provides relatively greater strength than is possible with a random alignment of fibers.

The major differences between the present invention and that of prior U.S. Pat. No. 4,702,870 include that the present invention produces an open cell grid and the prior patent is limited to the use of wood fiber. That prior patent produces three dimensional structural members made of wood fiber having a flat wall with flanges on one side of it. The versatility of the open grid of the invention is much greater than that of the product of that prior patent. However, the developed technology with which that prior invention is implemented is usable, in large measure, in the present invention, and that, by itself, is an important advantage of the present invention, i.e., use of proven and developed machinery and methods.

The open grid structures produce in accordance with the invention are quite different from and can be used in different applications than the structures produced in accordance with the '870 patent. For example, when bonding two liners or boards to either side of a core, it is important to have balanced construction. With the open grid of the invention, bonding two similar liners to either side of the open grid would produce a balanced construction. With the '870 product, when the two liners are bonded to the two sides of the product produced thereby, the properties on the flat side will be considerably different from those on the rib side. Further, the open grids produced in accordance with the invention can be wrapped around a smaller radius than can the products produced by the '870 patent. In addition, only the invention could be used if it were desired to have the ability to see through the structure produced. The solid wall produced by the '870 patent would not have this ability. Yet another difference is that if a light weight structure yet a thin strong structure using a minimal glue spread were desired, then an open flat grid produced in accordance with the present invention would be preferable over the product produced by the '870 patent. Another feature is that, when using double consolidation from opposite sides of the two structures, with the open grid of the invention, the grid bars will be more uniform and there will be more complete densification. With the '870 patent, using double pressing on the ribs, the same degree of uniformity and densification could not be achieved. Finally, the finished product of the invention could be used in different environments than could that produced by the '870 patent, because the products produced in accordance with the invention in general will be stronger, all other things being equal or comparable.

The open cell grids produced by the invention have many applications. They can be used to produce furniture, boards of different sorts for walls in aircraft and the like, as insulators, and as cushioning members of various sorts. Further, it is possible to stack several grids produced by the invention, offsetting the bars and cells from one to the next, and joining them with thin sheets therebetween. This resultant composite structure will be extremely strong as well as lightweight and will have good insulating qualities. The cells are thus sealed by the thin sheets to each side, and the sheets improve the resistance to bending and twisting of the composite structure. That is, an open cell grid of the invention is more susceptible to twisting and bending by itself than it is when bonded to relatively thin sheets on one or both sides of the grid.

Another important advantage of the invention is that it utilizes fiber derived from the currently under-utilized scrap wood produced by commercial lumbering and wood cutting. In addition, the invention can be used either with such cellulose fiber alone, with a non-cellulose fiber alone, and with combinations of cellulose fiber with some non-cellulose fiber. For example, the addition of varying amounts of polyethylene, polypropylene, and other plastic materials can impart improved performance characteristics to the final product in regard to resisting water, improved strength, resistance to shattering, and the like. This application of the invention method and apparatus to all sorts of fibers is an important advantage of the invention.

As is clear, production of various products using the open cell grids of the invention in place of solid material as the core material, such as in some furniture and structural members for example, achieves important advantages of reduced weight. Cost may also be reduced, that depends on many factors. These advantages are achieved while maintaining sufficient strength for the particular product. Advantages for open cell cores also include less material consumed, reduced shipping costs, and facilitates handling and assembly by the manufacturer, the carriers, and finally, the ultimate purchasers. For some applications, the strength-to-weight ratio is of extreme importance over maximum strength obtained from a solid core. This reduction of weight, with minimal loss of strength through the use of open cell structures, has long been known in the aviation area for making partitions, structural components, and the like on board aircraft.

In order to perform the invention method in a continuous manner, it is an important advantage that state of the art machinery and techniques can be used. That is, various standard machines to lay down the fiber, and to form the grid, and later to dry and cure it, are all utilizable, in both continuous and batch variations, in order to implement the invention Again, this is an important advantage in that proven state of the art technology with little modification can be incorporated into the invention.

The invention is extremely versatile in all its facets. It can be used to make open cell grids in many different sizes, in discrete or continuous pieces, in all sorts of thicknesses, that is, thicknesses of the grid overall (which corresponds to the heights of the grid bars) as well as the thickness of the bars themselves making up the grid, and of all sorts of materials and combinations of materials. The end products are useful for many reasons, including containers, panels for home and vehicle construction, insulating panels, and all sorts of other applications.

There is thus provided a method and apparatus in accordance with the invention which is well suited to its areas of application, which achieves important advantages, and which is thus highly suited to its areas of application.

BRIEF DESCRIPTION OF THE FIGURES OF THE DRAWINGS

The invention will be better understood with reference to the accompanying drawing which also forms a part of this disclosure, and wherein:

FIGS. 2A-2E show a few variations of the open cell monolithic grids which can be made in accordance with the invention;

DESCRIPTION OF THE PRIOR ART

Figure 1A:
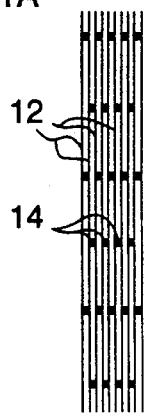
FIGS. 1A and 1B are side and plan views illustrating a prior art method of making expanded open cell grids.
Figure 1B:
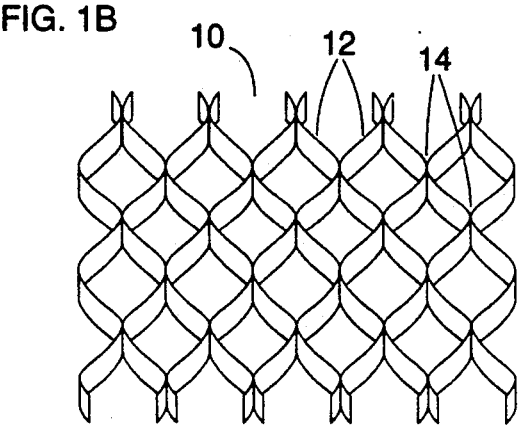

Referring to FIGS. 1A and 1B, there is shown a prior art method of producing open cell grids which are superficially similar to those produced by the invention. The grid 10 of FIG. 1B is commonly called a "honeycomb." These honeycombs are fabricated from flat sheets or strips 12 or paper or paper-like materials which are combined by means of spaced spots of glue 14. The assemblage shown in FIG. 1A is pressed, and then the adhesive is allowed time to cure The assemblage is trimmed and then expanded into the structure shown in FIG. 1B.

The present invention provides advantages over this particular prior art, namely, the avoidance of glue and the other multiple fabrication steps, and the greater flexibility of production of many different sorts of open cell grids. The invention differs from this prior art in that properties in the length and width directions could be engineered. The prior art "honeycomb" material is made of strips 12 of paper like material combined by means of spaced spots of glue 14. The strength properties parallel to the length of the papers is higher than the properties perpendicular to the length (the width direction) as shown in FIG. 1B. In this invention, because of the way in which the fibers form between the pads, they will predominantly lay along the lengths of the grid bars. Thus, for a square pattern the properties will be uniform in the length and width directions. A hexagonal pattern will have uniform properties in three directions as shown by the arrows in FIGS. 2A and 2C as examples. Complex patterns will have their main properties along the directions of the grid bars in the pattern. An advantage of this invention is that because the fibers from, randomly yet predominantly along the lengths of the grid bars, then the grid arrangement or pattern could be engineered for specific length, width, or off axis property requirements.

The invention should also be distinguished from the prior art of corrugated fiberboard. Corrugated fiberboard is made from flat fiberboard material. A single sheet is corrugated and is made into the middle core, or corrugated medium. This requires a separate operation. Adhesive is applied to the nodes of either one or both sides of the corrugated middle core, and then bonded to one or two flat sheets, respectively. The shape of the core is maintained by the bonds. The present invention has important advantages over this technology, in that the fibers are formed directly into the finished shape in one step. Again, no gluing or adhesive steps are required to maintain the shape or for any other reason, except, in certain embodiments, to bond the fibers together into the invention's monolithic grid. Further, panels produced with grids according to the invention are stronger and have different characteristics than do corrugated board.

The invention should also be distinguished from certain pulp molded articles, such as egg cartons, pots for flowers and the like, baskets, cushioning ends for fluorescent light tubes, and the like. These products are made on rigid molds. The mold is often semi-porous and is covered with screening material. A vacuum is pulled at the back of the mold causing flow through the screen and the mold so that the fibers form a uniform mat over the screen. The mat on this rigid mold is consolidated with a mating reverse shaped solid mold pressed against the mat on the forming mold. This consolidates the mat between the two mating molds. The direction of the consolidation force is perpendicular to the mat. In the present invention the consolidation force is both parallel and perpendicular to the bars of the grid.

DETAILED DESCRIPTION OF THE PREFERRED EMBODIMENTS

Referring now to the group of FIGS. 2A-2E, various forms of the grids which may be produced in accordance with the teachings of the invention are shown.

Figure 2A:
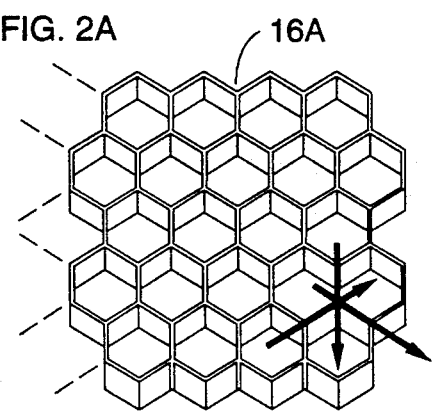
Figure 2B:
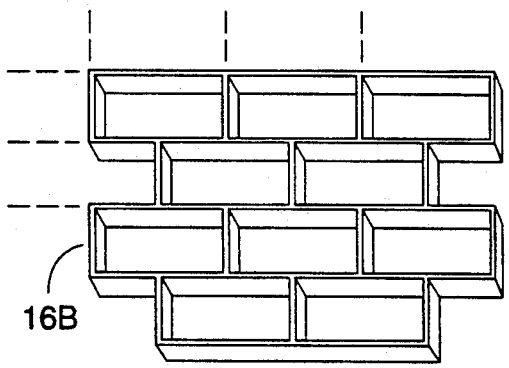
Figure 2C:
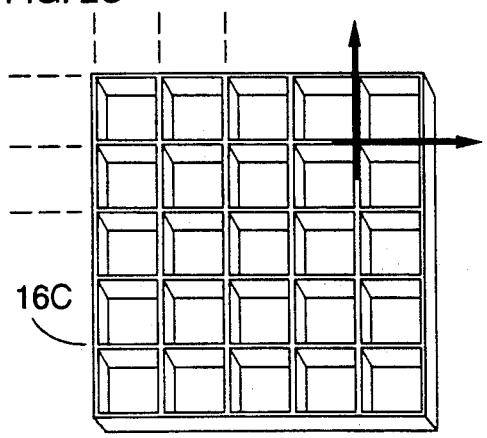
Figure 2D:
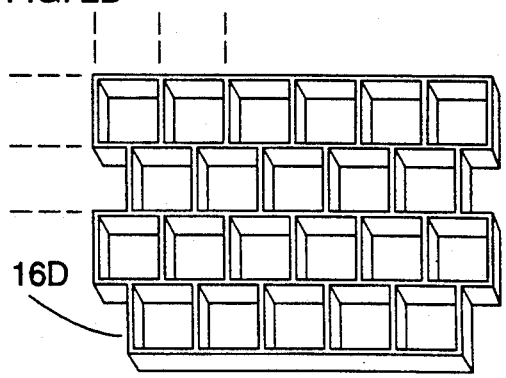

In FIG. 2A the grid 16A is of a hexagon open cell structure. In FIG. 2B, this grid 16B is made up of rectangles arranged in an overlapping or brick wall type of array. In FIG. 2C, the grid 16C is made up of square cells arranged squarely with respect to each other. In FIG. 2D, the grid 16D has square cells, but they are off set in rows by ½ of a cell. FIG. 2E shows mixed cell shapes In all of these FIGS. 2A-2E, the dotted lines indicate that the grid can have an indeterminate length and/or width.

FIG. 2E shows yet another important facet of the versatility of the invention. The invention has the ability to put the fiber, and thus the strength, in different parts of the same structural component. Referring to FIG. 2E, a grid 16E is shown as being made up of cells of many different sizes and with the various size cells in different configurations and relationships to each other. Grid 16E includes small square cells, large square cells, very large square cells cut in half into triangular cells, and small and large rectangular cells. Again, the dotted line showing indicates that the shapes and lengths and widths are indeterminate in accordance with other teachings of the invention as set forth herein. It can be appreciated especially well from FIG. 2E that the variations of grids producible in accordance with the invention, are substantially without any limit, only the designer's imagination and need driven demands define the bounds As is clear from these figures, any sort arrangement could be used. The cells could have triangular shapes, pentagon shapes, and all sorts of geometric and non-geometric other shapes. The variations are literally without limit.

An important advantage of the invention is that it may be used for fabrication of various kinds of structural products and nonstructural products, structural components of such products, such as core stock for doors or lightweight office furniture, such products as used in various places in housing construction and in commercial construction, and in any other place where lightweight, high strength panels are required Nonstructural products and components of such products include cushioning sheets and insulation products and similar products as used in various places where lightweight, low density structural panels are required.

Figure 3:
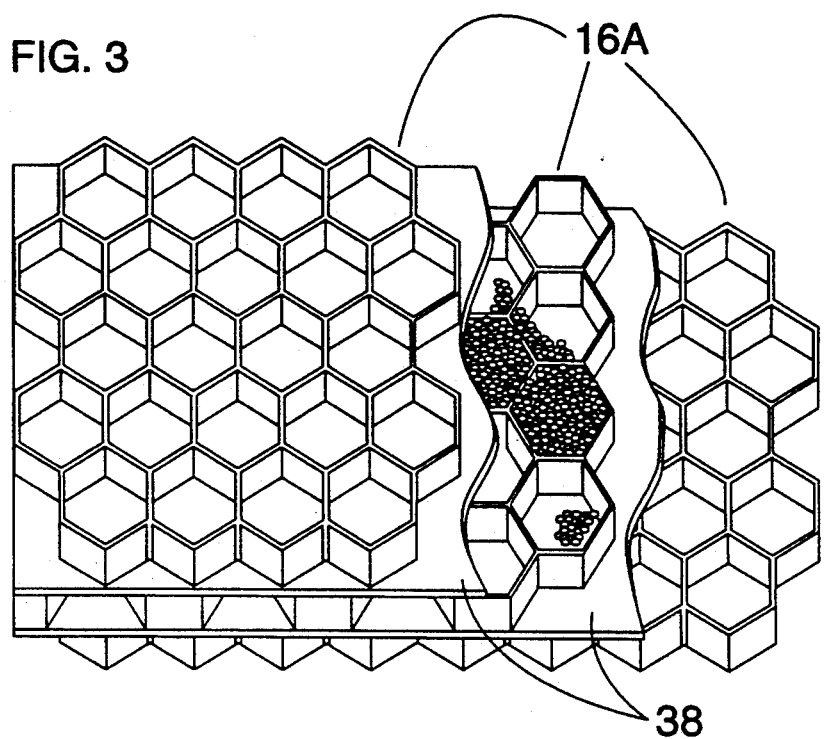
FIG. 3 illustrates three grids produced in accordance with the invention stacked to make a composite product.

FIG. 3 shows a composite such panel. Three of the grids 16A of FIG. 2A are shown by way of example. Any of the other grids could be used, and combinations and multiple layers of such grids could be used as well. Inter-sheets 38 of any suitable material are used to bond the three grids 16A together. It should be noted that the middle grid 16A has been rotated 90° with respect to the two outer layers Rotating the middle grid(s) at various angles can be used to balance or otherwise engineer the properties in the length and width directions of the panel or to enhance specific properties along a specific direction(s).

Other advantages of a multi-grid construction such as that shown in FIG. 3 is that the insulation quality is tremendously enhanced, one or more of the grids can be used to still further enhance both sound and thermal insulation by filling the cells thereof with suitable material. Also, fire retardant materials can be used to fill the cells to achieve that important advantage in the composite structure, and other advantages can also be achieved. This optional filling of the cells is shown in FIG. 3. It is also possible to so fill the cells of all of the grids, where the panel is closed, as in a door, for example. Also, the grids could be bonded directly to each other, but the sheets 38 are preferred because they add great strength to the composite structure, much more than they have by themselves, when bonded to grids produced in accordance with the invention.

FIGS. 4-10 show the basic principles of operation of the invention. Prior to the description thereof, an understanding of certain terms will be helpful.

The grids produced by the invention are shown in FIG. 2. Referring to those figures, one can first think of the grid as having a plane. The cells have axes and they are perpendicular to the plane of the grid. The bars define the cells, and together constitute the grid. The thickness of the grid bar is measured in the plane of the grid. The height of a grid bar is measured perpendicular to the plane of the grid, i,e., parallel to the axes of the cells. The heights of the grid bars define the thickness of the grid overall.

The invention utilizes much of the same apparatus as prior U.S. Pat. No. 4,702,870. Compare FIG. 1 of that prior patent with FIGS. 4-7 of the present invention. Thus, the invention, in its simplest form, comprises a carrier 18 which carries a plurality of elastomeric pads 20. Carrier 18 can be a screen formed of a suitable metal or synthetic material.

Figure 4:
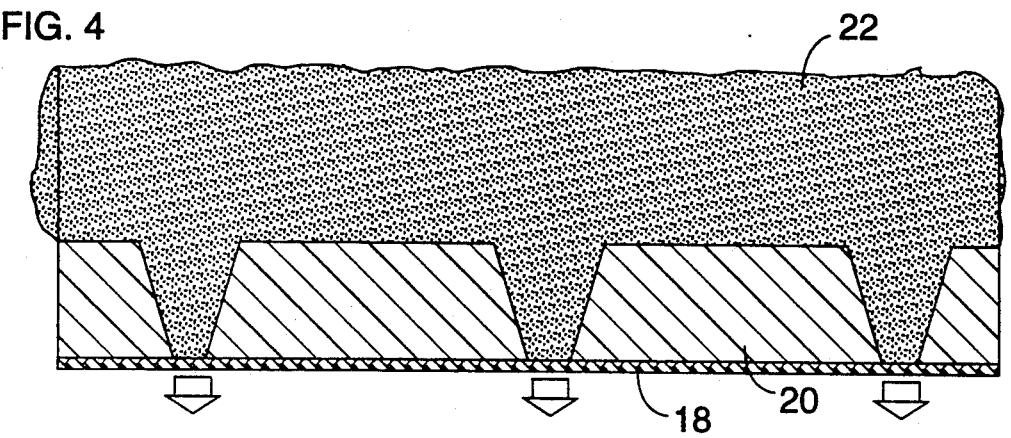
FIGS. 4-8 illustrate the principles of operation of the invention.
Figure 5:
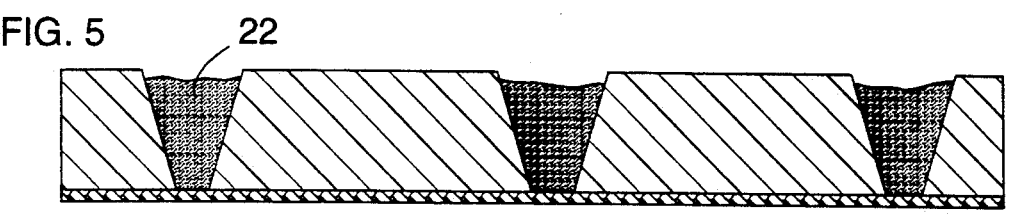

Referring now to FIG. 4, fibers 22 are carried in a suitable carrier fluid and are flowed through the carrier, screen or support 18 and around the pads 20. This deposition of the fibers is shown in FIG. 4, the arrows indicating the passing of the carrier fluid, air, water, or other fluids, through the deposited fibers and the carrier or screen 18. FIG. 5 shows the end of the fiber deposition step. The amount and type of fibers used and provided in the carrier fluid is such that the fibers fill up only the spaces between the pads, and do not deposit on top of the pads, as is illustrated in FIG. 5. This is one of the main differences from the prior invention of U.S. Pat. No. 4,702,870, as can be seen by comparing FIG. 5 herein with FIG. 3 of that prior patent.

Referring to FIG. 5 again however, it should be borne in mind that the invention is not limited to filling the spaces between the pads completely Certain applications of use of the invention may dictate that the spaces between the pads will be filled only partially, for example, half-full or one-third full or the like. Such an option is easily within the ability of those skilled in the art. This variation, that is partial filling of the spaces between the pads, allows one set of pads on a screen to be used to produce grids of different sizes and performance characteristics.

Figure 6:
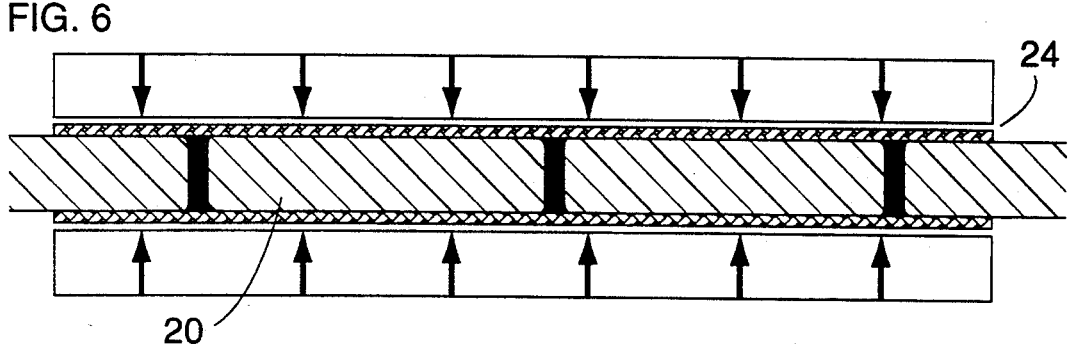

FIG. 6 illustrates consolidation of the fibers 22 deposited between the pads 22. To this end, pressing means 24 are provided. The pads 20 are compressed by a force applied normal to the plane of the grid to be produced, and normal to the screen 18. This is indicated by the force arrows in FIG. 6.

The present invention, while it uses some of the same apparatus and techniques of prior U.S. Pat. No. 4,702,870, also uses different techniques. An important difference is the pressure applied and the kind of rubber used in the pads 20. Looking at FIG. 10 of the '870 patent, for example, it can be seen that when consolidation occurs, the sides of the pads take a substantially curved shape. Looking at the corresponding FIG. 6 of the present application, it can be seen that the sides of the pads take a substantially straight configuration, as is required to produce the bars of the grids which are produced in accordance with the present invention. This difference comes from two sources. First, in general, higher pressures are used in the present invention. In the prior patented invention, the working pressure was usually well below 100 psi, and the range recited was 25 to 100 psi. In the present invention, the working pressure is usually above 100 psi, and the working range is 100 to 500 psi. However, this range is not a limitation. The invention has been used to produce grids at pressures as low as 3 psi. Further, it is thought that higher pressures, even significantly higher pressures, than 500 psi can be used. It is thought that pressures as high as 1,000 psi could be successfully used in accordance with the teachings of the invention.

Further, it is anticipated that, when brought to commercial application, the present invention may use softer grades of rubber for the pads 20 than were used in the 4,702,870 patent. This will enhance the straight sides on the pads to make the grid bars straighter in the present invention. But, substantially straight sides often are desirable in the present invention, and thus the increase in pressure and the change of rubber composition are utilized to accomplish that goal in the present invention.

Figure 7:
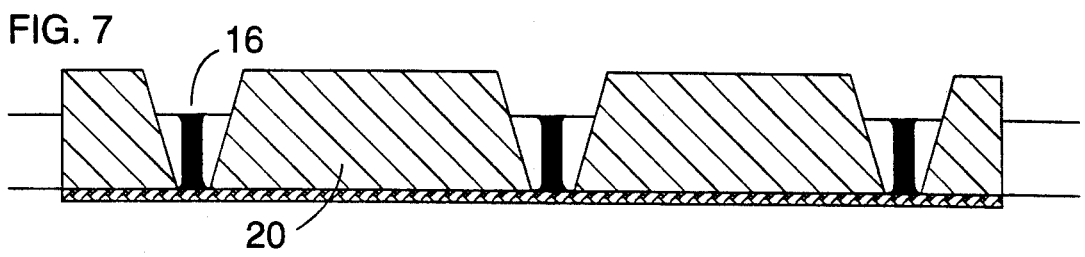

It should be noted that the pads 20 compress under the pressure and deform outwardly parallel to the screen while still maintaining a substantially straight configuration, as shown in the drawings. Thus, the grid bars are consolidated in both the vertical and horizontal directions. The vertical direction corresponds to the height of the bars of the grid produced, and the horizontal consolidation corresponds to the thickness of those bars. FIG. 7 shows the pressing means 24 removed, the pads returned to their relaxed state, and the resultant consolidated grid shown in place on the mold between the pads 20.

The force arrows and pressing means 24 shown in FIG. 6 could represent platens, rollers, or other means to apply pressure to consolidate the grid, all of which is within the scope of well developed technology and known to those skilled in these arts.

Figure 8:
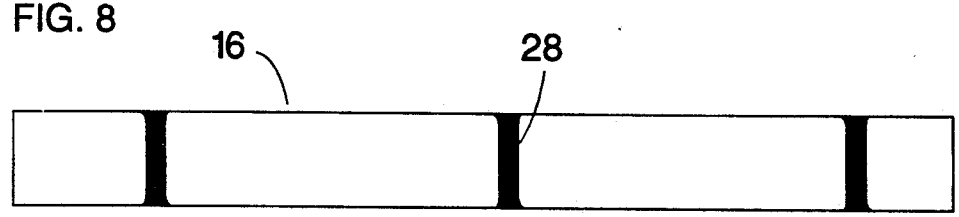

FIG. 8 shows the grid 16 removed from the mold. Bars 28 make up the grid 16, and they define the open cells therebetween.

Figure 9A:
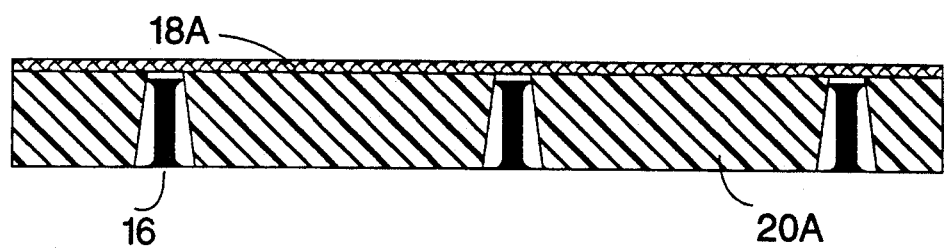
FIGS. 9A-9C show the embodiment of the two-sided consolidation or pressing.
Figure 9B:
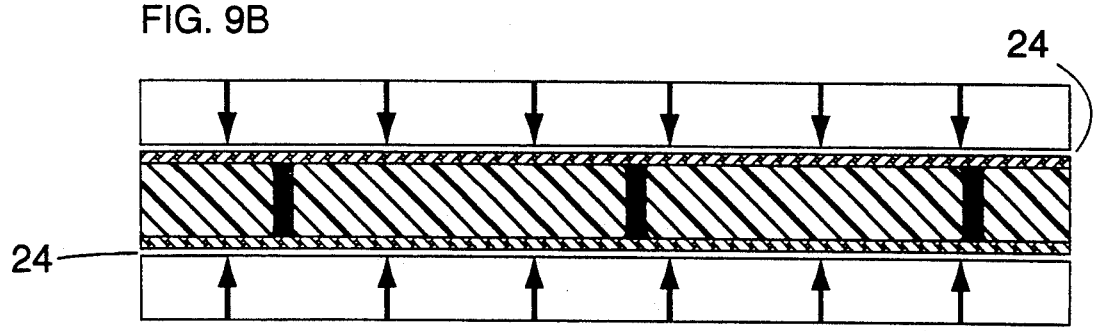
Figure 9C:
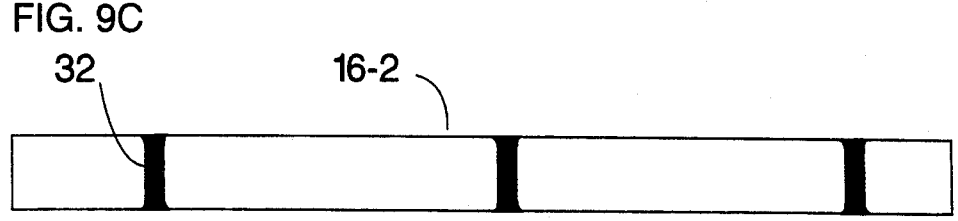

The grid 16 produced, pressed from one side only, is usable just as shown in FIG. 8. However, in certain applications, and with certain fibers or mixtures of fibers, it may be desirable to produce a grid which is stronger, and wherein the bars are shorter, but denser and stronger, than those shown in FIG. 8. Such a grid 16-2 having bars 32 is shown in FIG. 9C. The manner of its production is shown in FIGS. 9A and 9B.

To do the second consolidation or pressing, see FIG. 9, the grid 16 produced at the end of the processes of FIGS. 4-7 is inserted into a second mold made up of support 18A and pads 20A, such that the sides of the grid bars formed opposite from support 18 are now next to support 18A with the bars between elastomeric pads 20A. The pads 20A can be dimensioned to more accurately control the dimensions of the grid 16-2 produced by the second pressing. Likewise, the spacing of the pads 20 can be different from that shown in FIGS. 4-7. That is, if it is necessary to go to the effort of a second pressing, there is additional versatility afforded by the methods of the invention in order to control the configuration of the final grid 16-2 and its bars 32, see FIG. 9C and compare it to FIG. 8.

As can be seen from a comparison of FIGS. 8 and 9C in the panel produced after consolidation or a pressing from both sides, the ribs are shorter and the bars 32 are also considerably denser and stronger than are the bars 28 produced after only a single consolidation or press in accordance with that embodiment of the invention. FIG. 9C also indicates that the double pressed grid carries a different reference numeral, numeral 16-2, to indicate consolidation or pressing from both sides and to differentiate it from grid 16 pressed from only one side. This designation 16-2 will be used again in other Figures and in the discussion herein.

This trade-off of the second step, together with its cost and effort, is also weighed against the differences in the two products. That is, the FIG. 8 single consolidation bars may be desirable where the added strength is not needed and the added larger dimensions are more important On the other hand, the smaller, denser, stronger bars of FIG. 9C may be worth the extra effort of the second consolidation in other end use situations.

The grid 16 is inserted from the opposite direction into the mold made up of the parts 18a and 20a. Then pressure means 24 are applied, in the manner shown in FIG. 6. The consolidation process, utilizing FIG. 9B, is thus similar to that shown in regard to FIG. 6 and described above, except for the differences described.

In both cases, that is, the grid 16 produced at the end of the single pressing operation, or the grid 16-2 produced at the end of the double pressing operation, the grid is then dried, any adhesive used is cured, and other finishing processes well within the normal technology of this art is applied to complete the grid 16 or 16-2 and make it a finished product. Where non-cellulose fibers are used, some of the fibers may be actually melted in order to cure the mat into the grid 16 or 16-2.

It is desirable to reverse the grid 16 with respect to the trapezoidal spaces between the pads 20A when using the second press procedure of FIG. 9. There are many reasons for this One reason is that any discontinuity or difference in pressure that might have occurred in the first press is compensated for by the second press when the grid is inserted in the reverse direction. This reversal also tends to reduce the size of the fillets at the top and bottom of the grid bars, i.e., a straighter, flatter, grid bar is produced by the second pressing. Also, any stray fibers, which may be an annoyance in the grid 16 produced by a single press, are consolidated into the grid bars in the second press, thus producing a neater, cleaner looking grid as a result of the second press of FIG. 9.

Figure 10A:
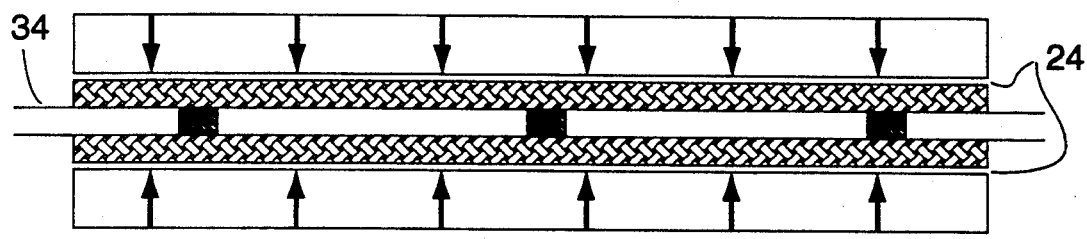
FIGS. 10A and 10B show the variation of off-the-mold pressing of the grid.
Figure 10B:

Yet another option is illustrated in FIGS. 10A and 10B. In this case, the grid is changed in character after it is formed but before it is cured or otherwise finished This grid 34 can be either the grid 16 formed after the single pressing, or the grid 16-2 formed after the double pressing The grid is taken off of the mold, and put by itself in the pressing means 24. At least a single pressing would be required so that the grid would have sufficient strength to be taken off of the mold and moved to a work station such as shown in FIG. 10A. The resultant grid 34 is shown by itself in FIG. 10B. Again, final steps such as drying and curing would be needed to produce a finished product.

The basic principles of the operation of the invention shown in and described with respect to FIGS. 4-10 are applicable to both a batch or a continuous type of process. The remaining FIGS. 11, 12 and 13 illustrate further variations and constitute additional teaching in regard to embodiments of the invention wherein the grids, both single and double consolidation grids, are produced in a continuous manner.

FIG. 11 shows two different forming methods for deposition or forming of the grid. FIG. 12 shows several different variations of the pressing and forming of the grid. FIG. 13 shows several variations of drying and curing or finishing of the grid.

Figure 11A:
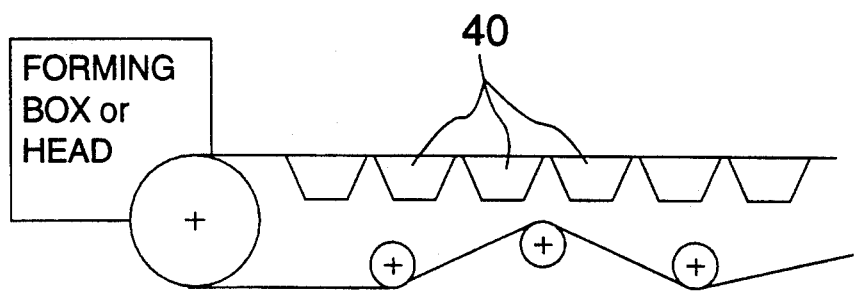
FIGS. 11A and 11B pertain to the continuous embodiments of the invention and show machine for the deposition of the fiber.
Figure 11B:
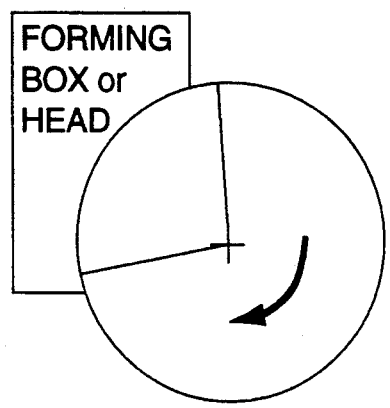
Figure 12A:
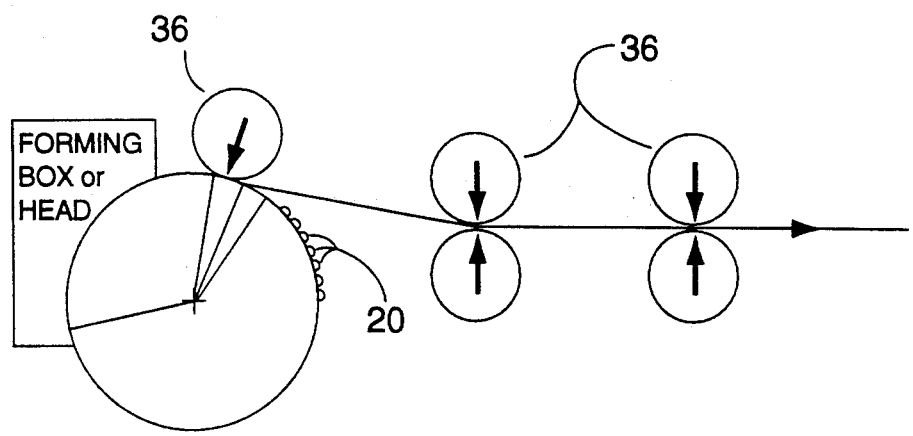
FIGS. 12A-12F relate to the continuous embodiments of the invention and illustrate the manner of forming and pressing the fibers to form the grids.
Figure 12B:
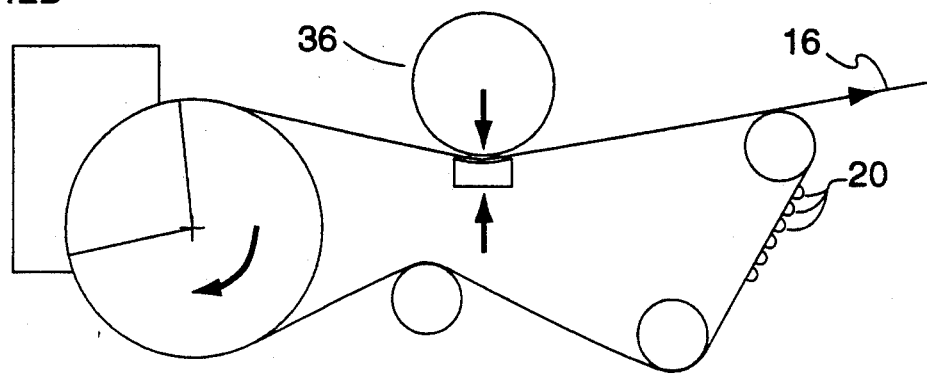
Figure 12C:
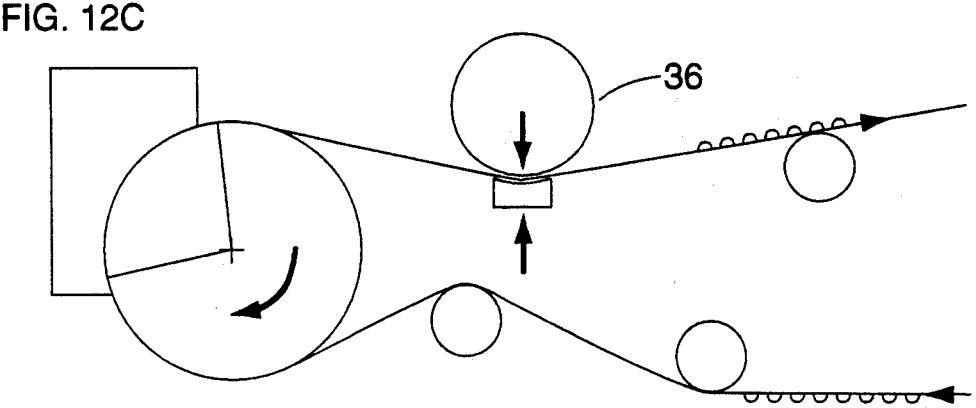

It is within the teaching of the invention, and in fact it is a facet of its versatility, that either of the two forming processes of FIG. 11 could be used with FIGS. 12A, 12B, or 12C. If pressing from both sides is desirable, then either of FIGS. 12A or 12B would be followed by FIGS. 12D, 12E, or 12F. Drying of the grid of FIGS. 12A-12E can be done with any one of the processes of FIG. 13. The exact combination which would be used is dependent on the fibers, the end result desired, the sizes, and other parameters surrounding any particular use situation.

FIG. 11 shows two continuous forming methods that can be used in accordance with the invention. FIG. 11A is a simplified drawing of a forming section known in the art as a Fourdrinier forming section. FIG. 11B is a simplified drawing of a cylinder forming machine. Either can be used in accordance with the teachings of the invention. The elements 40 shown in FIG. 11 are vacuum boxes or the like which assist in forming the grid 16 on the moving belt, in a more or less conventional manner for this kind of apparatus.

In FIGS. 12A, 12B and 12C, a cylinder forming machine is shown in combination with three different types of pressing arrangements. The Fourdrinier forming section of FIG. 11A could just as well be used. Likewise, other means known in the art could be used.

FIG. 12A shows the special screen on the cylinder former only. A press 34 is positioned at the top of the cylinder to press the fiber mat and the elastomeric pads 20. Thereafter, the fiber grid has sufficient strength to be lifted from the screen and transferred to roll presses 36. The rolls 36 are the counterpart of the pressing means 24 of the earlier figures. The result of this process of FIG. 12A would be analogous to the grid 34 of FIG. 10B, i.e., a short, squat grid with relatively thick bars.

In FIG. 12B, the special screen extends off of the forming cylinder around other rollers, and then returns to the underside of the cylinder The large diameter press 36 could be similar to a state of the art extended nip press built by Beloit Corporation of Beloit, Wisconsin, or a similar such wide nip press, or similar wedge press.

Figure 12D:
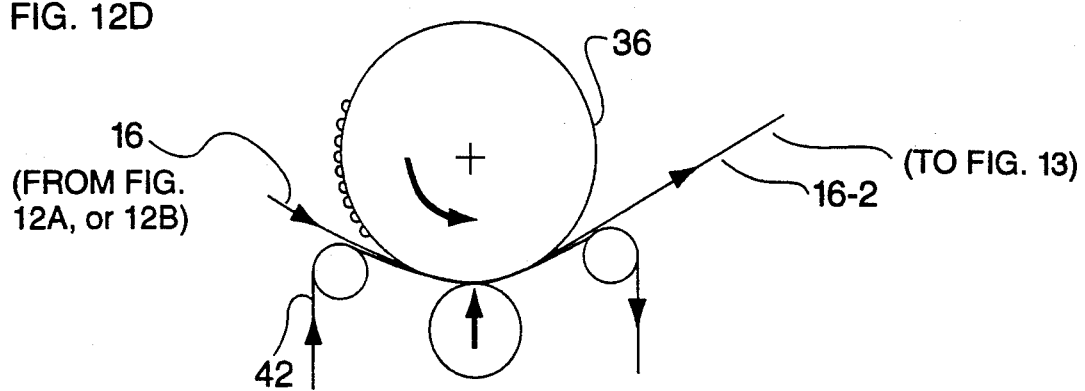

The schematic showing 36 in FIG. 12B could be either a roller or, more accurately for that Figure, a kind of pressing device called a shoe nip. A more accurate schematic representation of a roller nip pressing device is shown in FIG. 12D. The two are interchangeable, but, in many cases, the shoe nip of FIG. 12B is preferred.

In FIG. 12C, the special screen, together with the grid, are carried together into one of the drying schemes. That is, the special screen carrying the pads is long enough to extend right through forming, pressing and curing. The curing is done after FIGS. 12A and 12B in any of the forms of FIG. 13.

Figure 12E:
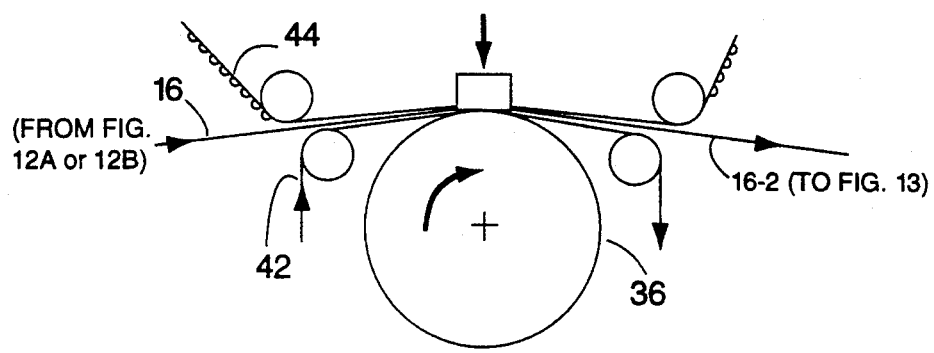
Figure 12F:
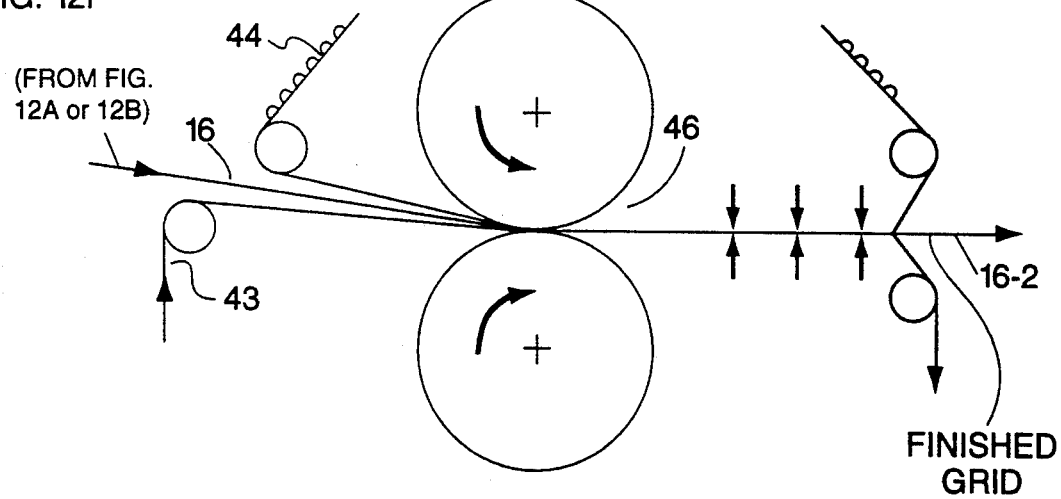

FIGS. 12D, 12E, and 12F show three of the many possible means to produce the double consolidated or pressed grid 16-2 of FIGS. 9B and 9C described above A second set of pads, as described above, are inserted into the cells of the once consolidated (but not yet cured and finished) grid 16 from the side opposite that from which the first set of pads were inserted, and then a second consolidation or pressing applied to the first grid 16 to produce the second grid 16-2.

In FIG. 12D, the grid structure 16 produced from any of the prior FIG. 12 versions, is fed into a press 36 having the pads attached to the drum as shown in the drawing These pads are slightly different from the first set of pads (see the discussion of this point about the two sets of pads above). A press felt 42 is used to assist in gently pushing the already formed cells in the grid 16 onto the pads on the drum 36. As discussed above, this drum can be either a shoe nip as shown in FIG. 12B or a roller drum as shown in FIG. 12D. It is thought, at present, that a shoe nip might be better, but that is, of course, dependent upon the parameters of the particular embodiment in use. Further, felt 42 can also be used to absorb water or other fluid that might still be present in the not yet dried grid 16. Dryer felts such as item 42 are well known in this art, they are tensioned to apply a very slight holding, and in the case of FIG. 12D, application pressure; a pressure in the range of 0.5 to 2 psi holding pressure is very typical.

It should be noted that the pads in these FIGS. 12D, 12E, and 12F are inserted from the side opposite that in which they were inserted in FIGS. 12A, 12B or 12C which form a single pressed grid 16.

FIG. 12E shows a variation wherein the second set of pads are provided on a continuous or closed loop screen 44. The method of operation and product is otherwise identical to that of FIG. 12D, including the felt 42, as described above.

As indicated in regard to FIGS. 12A–12E, the grid produced, be it 16 or 16-2, is then fed on to FIG. 13 for drying and finishing. FIG. 12F shows a composite second press and drying arrangement which comprises a continuous pressure dryer 46. A dryer felt 43 is also used, together with a continuous screen carrying the pads for the second press The arrangement of FIG. 12F applies continuous pressure and, if desired, heat, so that the end product of FIG. 12F is finished grid, i.e., none of the variations of FIG. 13 are required in conjunction with FIG. 12F.

FIG. 13 shows various kinds of drying or curing arrangements which can be used in conjunction with the invention. Other such conventional means can also be used.

Figure 13A:
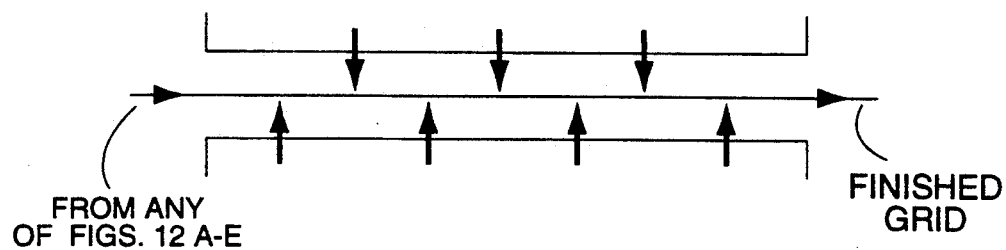
FIGS. 13A-13C illustrate drying and finishing grids produced in accordance with the continuous production forms of the invention.

FIG. 13A shows a high velocity hot air impingement type of drier wherein hot air is blown from the top and/or the bottom to dry the fiber grid. Note that there is no pressure applied normal to the grid in this form.

Figure 13B:
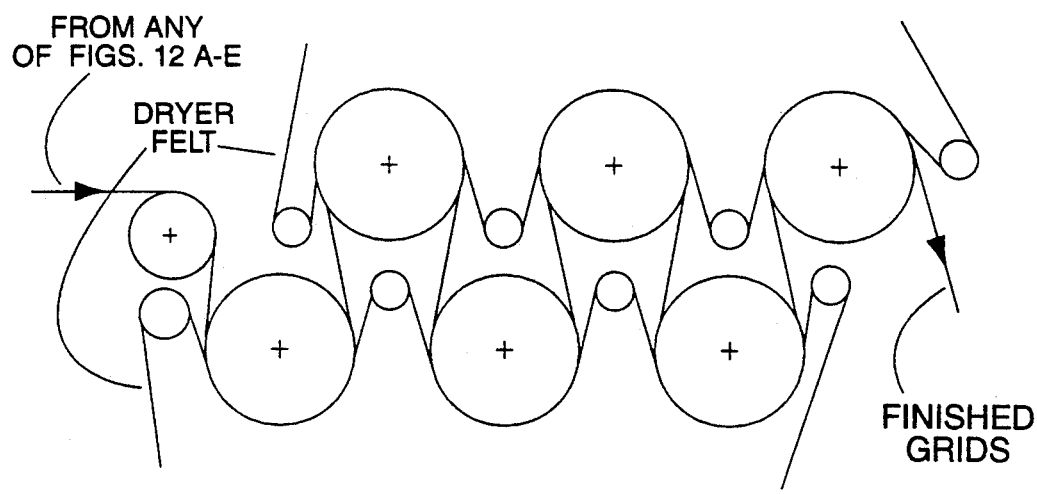

FIG. 13B shows a typical arrangement of a drum dryer as used in the paper industry. In this case, there is a small amount of pressure applied to the grid normal to the grid. This may be desirable in certain situations, and may be of no interest, that is, of no consequence, depending upon the particular grid produced.

Figure 13C:
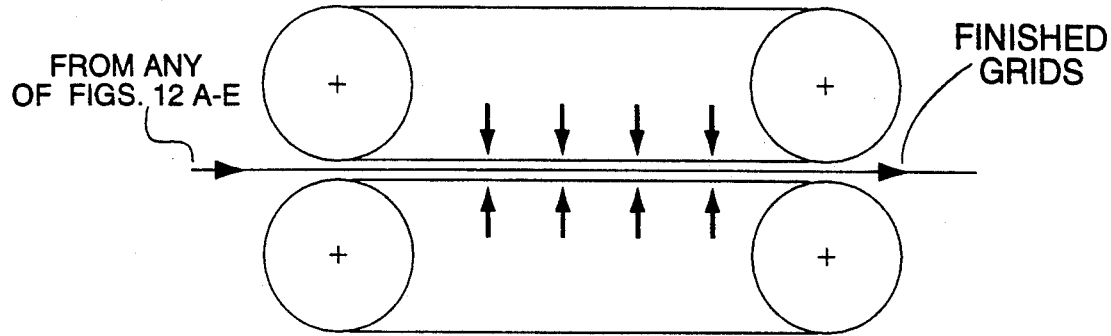

Finally, FIG. 13C shows a continuous type press. Continuous presses are used in the industry to make hardboard and particle board products. Continuous presses can apply a large pressure normal to the grid going through the drying process. In all three of these cases of FIG. 13, the grid alone or the grid together with the screen can be used to go through the drying-/curing or the like means to finish the grid.

While the invention has been described in some detail above, it is to be understood that this detailed description is by way of example only, and the protection granted is to be limited only within the spirit of the invention and the scope of the following claims.

I claim:

1. A method of making an open cell grid from fiber, said grid comprising a plurality of bars having their thicknesses parallel to the plane of said grid and their heights defining the thickness of said grid, comprising the steps of providing a porous carrier, providing a plurality of pads on said carrier, providing a predetermined size and shape for each of said pads, positioning said pads on said carrier in predetermined spaced relation to each other, forming said pads of elastomeric material, depositing fiber on said carrier to at least partially fill the spaces only between said pads, using a carrier fluid technique to perform said depositing fiber step with the carrier fluid exiting through the deposited fibers and through said carrier, consolidating said deposited fibers in directions both normal and parallel to said carrier; and performing said consolidating step by applying pressure in a direction normal to said carrier on said pads on the ends thereof remote from said carrier to cause said pads to expand parallel to said carrier to compress the bars of said grid in both their thickness and height directions and to impart substantially straight sides to said bars of said grid.

2. The method of claim 1 and performing the required steps of curing and drying a grid produced after said consolidating step as needed to thereby produce a finished grid.

3. The method of claim 2, and performing all of said steps starting with said deposition step continuously to thereby produce said grid as a continuous product.

4. The method of claim 1, and performing a second consolidation step on the grid produced after said first consolidation step, performing said second consolidation step by the steps of separating a grid produced after said first mentioned consolidation step with respect to said pads, producing a second set of pads, each pad of said second set of pads having a second predetermined size and shape, forming said pads of said second set of pads of an elastomeric material, positioning said pads of said second set of pads in predetermined spaced relation to each other, and all of the preceding steps beginning with said second consolidation step being performed such that the bars of said grid after said second consolidation step are shorter, thinner and denser than said bars were after said first consolidation step.

5. The method of claim 4, and providing a support for said second set of pads, providing said pads with sloped sides such that the cross-sectional shape of the space between each two adjacent pads is smaller than the corresponding space formed by said first mentioned set of pads, and turning said grid upside down with respect to said second set of pads for said second consolidation step as compared to the position of said grid with respect to said first set of pads during said first consolidation step.

6. The method of claim 5, wherein said bars of said grid are approximately 25% shorter in height after said second consolidation step than they were after said first consolidation step.

7. The method of claim 1, and selecting the pressure used in said applying pressure step to be in the range of more than 100 psi to about 500 psi.

8. The method of claim 1, and the step of further consolidating the grid produced after said consolidation step by the steps of separating said grid with respect to said carrier and said pads, and applying pressure to the bars of said grid parallel to their heights, whereby said bars after said consolidation step are shorter and thicker than they were after said first mentioned consolidation step.

9. In combination, apparatus for making an open cell grid from fiber, said grid comprising a plurality of bars having their thicknesses parallel to the plane of said grid and their heights defining the depth of said grid, comprising porous carrier means, a plurality of pads on said carrier means, each of said pads having a predetermined size and shape, means to position said pads on said carrier in predetermined spaced relation to each other, said pads comprising elastomeric material, means for depositing fiber on said carrier to at least partially fill the spaces only between said pads, said means for depositing fiber comprising a carrier fluid technique wherein the carrier fluid exits through the deposited fibers and through said carrier, means for consolidating said deposited fibers in directions both normal and parallel to said carrier by applying pressure normal to said carrier on said pads on the ends thereof remote from said carrier, whereby said pads are caused to expand parallel to said carrier to compress the bars of said grid in both their thickness and height directions and to impart substantially straight sides to said bars of said grid.

10. The combination of claim 9, wherein said predetermined sizes and shapes of said pads are selected from the group consisting of squares, rectangles, hexagons, other geometrical shapes, non-geometrical patterns, mixtures of the above mentioned shapes and patterns, mixtures of sizes all of one shape or pattern, and mixtures of both sizes of one shape or pattern and mixtures of the above mentioned shapes and patterns.

11. The combination of claim 10, wherein said carrier means is a screen formed of a material selected from the group consisting of metals and synthetic materials.

12. The combination of claim 9, wherein means for further consolidating the grid produced after said means for consolidating have operated upon said deposited fibers, said means for further consolidating said grid comprising a second set of pads, a second carrier for said second set of pads, each pad of said second set of pads having a second predetermined size and shape, means for positioning said pads of said second set of pads in predetermined spaced relation to each other, said pads of said second set of pads being formed of an elastomeric material, and all of the preceding means being such that the bars of said grid after said further consolidation are shorter, thinner and denser than said bars were after being first consolidated.

13. The combination of claim 12, wherein said bars of said grid are approximately 25% shorter in height after being further consolidated than they were after being first consolidated.

14. The combination of claim 9, wherein said pads have sloped sides such that the cross-sect shape of the space between each two adjacent pads of said second set of pads is smaller than the corresponding space in said first set of pads.

15. The combination of claim 9, and means for curing and drying said consolidated grid as needed to thereby produce a finished grid.

16. The combination of claim 9, and means to produce said grid as a continuous product.

17. The combination of claim 16, said continuous production means comprising one of a Fourdrinier forming machine and a cylinder forming machine both having said pads thereon.

18. The combination of claim 17, said continuous production means further comprising one of a cylinder press and a shoe nip press.

19. The combination of claim 18, said continuous production means further comprising one of a hot air dryer, a drum dryer, and a continuous press dryer.

20. The combination of claim 16, means to further consolidate the grid produced after said first mentioned consolidation, said further consolidating means comprising means for separating a grid produced after said first mentioned consolidation with respect to said first mentioned set of pads, a second set of pads with each pad thereof having a second predetermined size and shape, said pads of said second set of pads being formed of an elastomeric material, positioning said pads of said second set of pads in predetermined spaced relation to each other, and all of the preceding means being such that the bars of said grid after said further consolidation are shorter, thinner and denser than said bars were after said first mentioned consolidation.

21. The combination of claim 20, a support for said second set of pads, said pads being formed with sloped sides such that the cross-sectional shape of the space between each two adjacent pads in said first set of pads is larger than the corresponding space in said second set of pads, and means for turning said grid upside down with respect to said second set of pads for said further consolidation as compared to the position of said grid with respect to said first set of pads during said first mentioned consolidation.

22. The combination of claim 21, wherein said bars of said grid are approximately 25% shorter in height after said further consolidation than they were after said first mentioned consolidation.

23. The combination of claim 9, wherein the pressure applied by said consolidating means is in the range of more than 100 psi to about 500 psi.

* * * * *